Nov. 1, 1966 V. A. BICICCHI 3,282,553
BLAST VALVE
Filed April 1, 1964 2 Sheets-Sheet 2

United States Patent Office 3,282,553
Patented Nov. 1, 1966

3,282,553
BLAST VALVE
Vincent A. Bicicchi, Lombard, Ill., assignor to Henry Pratt Company, a corporation of Illinois
Filed Apr. 1, 1964, Ser. No. 356,497
3 Claims. (Cl. 251—62)

This invention relates to valves and in particular to blast valves.

In certain applications such as where explosive materials are utilized, it is desirable to provide valve structures such as for controlling ventilation to associated spaces with means for substantially instantaneous closing of the valves in the event of an explosion. The present invention is concerned with such blast closure valves providing improved positive selective positioning in the open and closed dispositions.

Thus, a principal feature of the present invention is the provision of a new and improved blast valve structure.

Another feature of the invention is the provision of such a blast valve structure including operator means for moving the valve to the closed position and means for alternative movement of the valve to the closed position independent of the operation of the operator means in the event of a pressure increase acting on the valve.

A further feature of the invention is the provision of such a blast valve structure including a valve body defining a passage to be closed, a closure member for closing the passage, a carrier, means for supporting the closure member on the carrier for selective movement with the carrier and movement relative to the carrier for disposing the closure member alternatively in a passage-open position and a passage-closing position, and means for operating the carrier to move the closure member therewith to dispose the closure member selectively in said positions.

Figure 1:
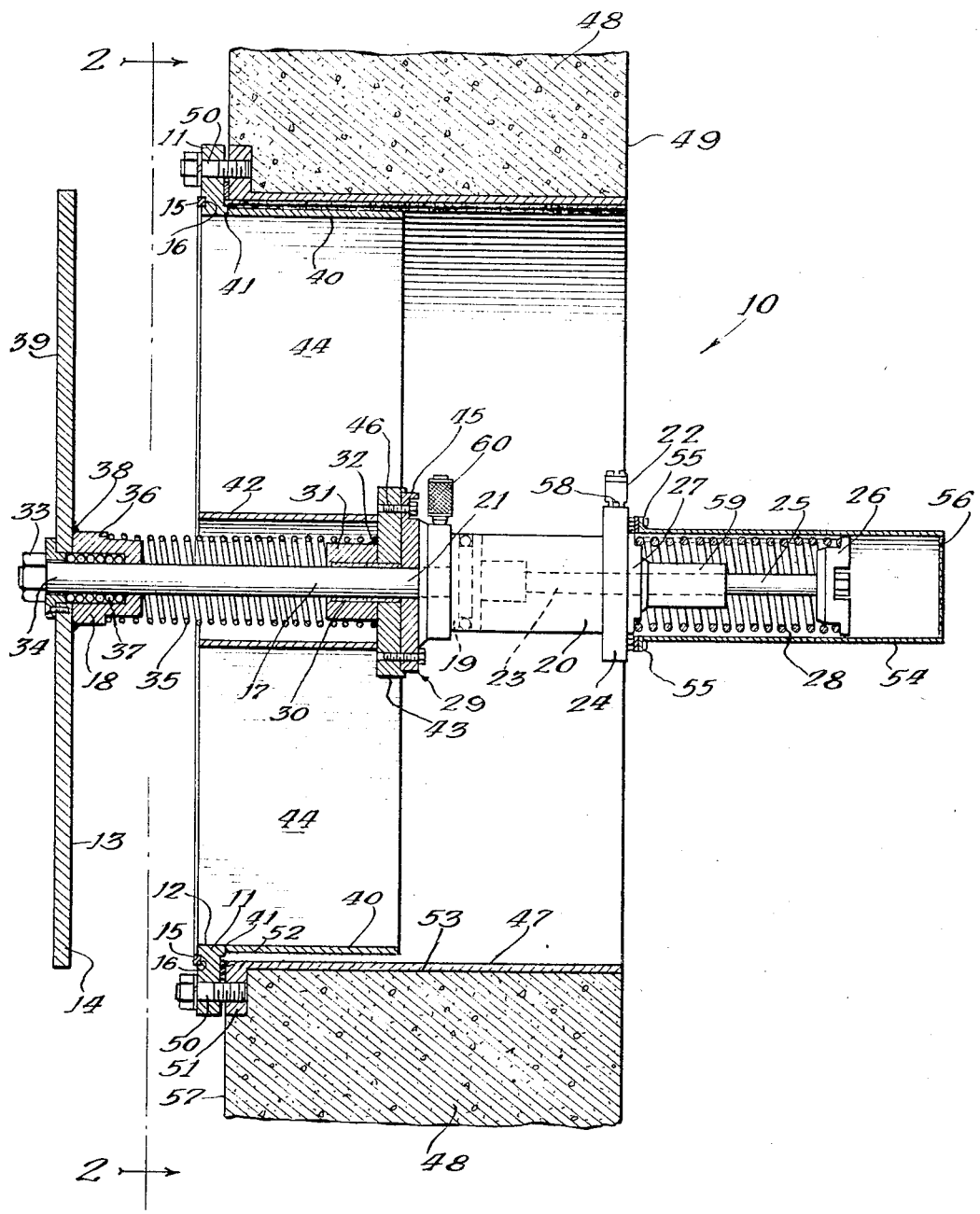
Figure 2:
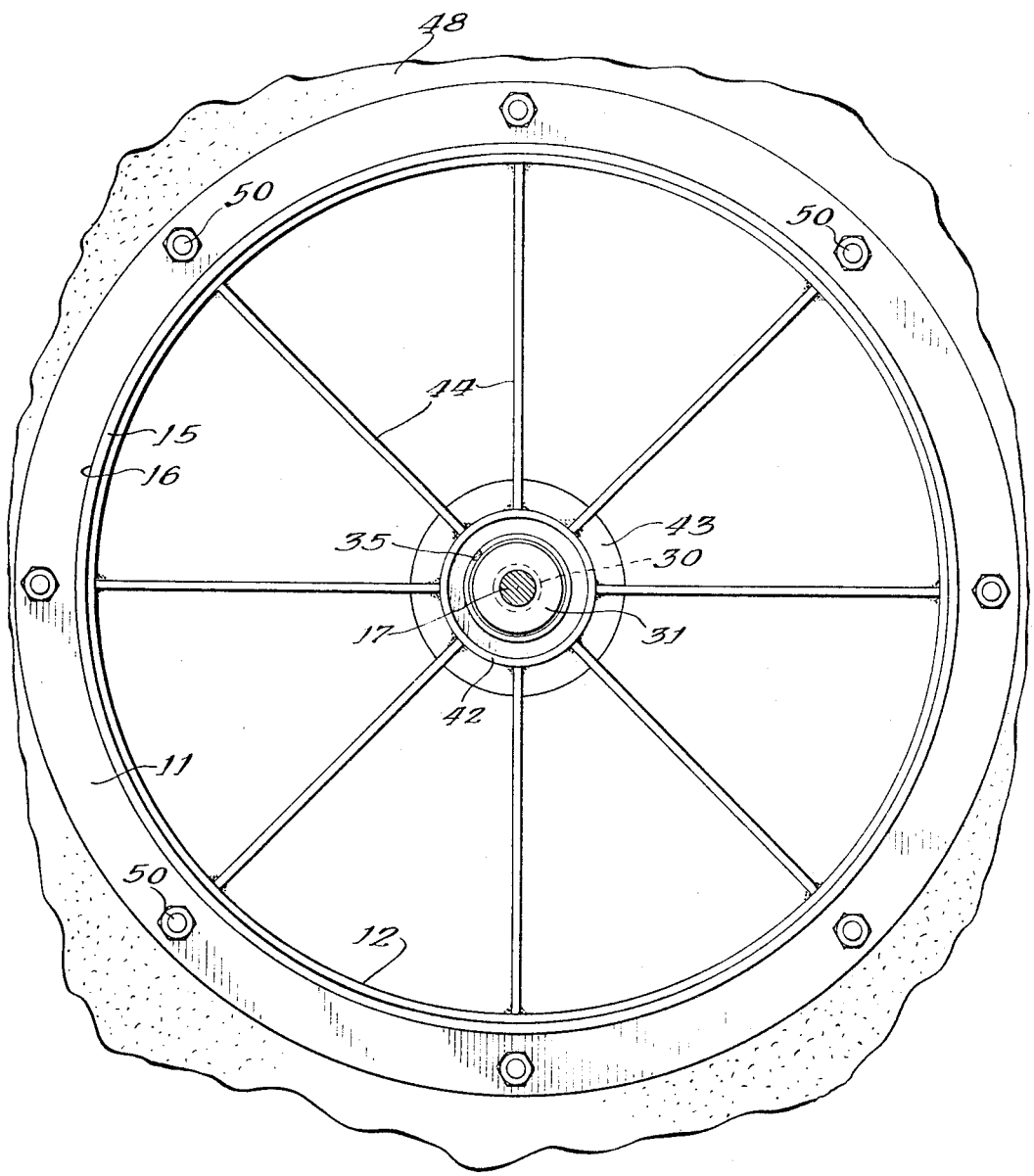

Other features and advantages of the invention will be apparent from the following description taken in connection with the accompanying drawing wherein:

FIGURE 1 is a vertical diametric section of a blast valve structure embodying the invention; and FIGURE 2 is a transverse section thereof taken substantially along the line 2—2 of FIGURE 1.

In the exemplary embodiment of the invention as disclosed in the drawing, a blast valve structure generally designated 10 is shown to comprise an annular valve body 11 defining a passage 12 to be selectively closed by a closure member 13 having a peripheral portion 14 adapted to be sealed to the body 11 in the closed position by means of an annular neoprene seal 15 carried by the valve body in a suitable groove 16 to extend axially outwardly therefrom. The closure member 13 is carried on a shaft 17 by means of a bushing 18 for selective movement axially relative to the shaft, or with the shaft, as will be discussed in greater detail hereinfollowing. The shaft 17 is moved axially by means of a piston 19 disposed within a cyclinder 20, the piston 19 being fixed to an inner end 21 of the shaft.

The piston 19 is reciprocated within cylinder 20 by means of air pressure delivered to within the piston through a dump valve 22. Illustratively, air under a pressure of approximately 200 p.s.i. may be delivered to within the cylinder 20 for moving the piston 19 to the leftmost position as illustrated in FIGURE 1. Extending to the right, as seen in FIGURE 1, from the piston is an operator rod 23 which extends movably sealingly through an end plate 24 defining one end of the cylinder 20. The distal end 25 of the rod 23 is provided with a spring retainer 26. A cooperating spring retainer 27 is secured to the plate 24, and a strong coil spring 28 is compressed between the retainers, as shown in FIGURE 1, urging the rod 23 to the right, or against the action of the air pressure within the cylinder 20. However, the force of spring 28 is made to be less than the force acting on the piston so that as long as the air pressure is maintained within the cylinder 20 the piston remains in the leftmost position shown in FIGURE 1 with the retainer in the leftmost position, thereby retaining the spring 28 in the fully compressed position.

The inner end 21 of the shaft 17 extends movably sealingly through a plate structure 29 at the lefthand end of cylinder 20 for connection to the piston 19. As shown in FIGURE 1, the shaft is slidably mounted in a bronze sleev bearing 30 carried in a bearing mount 31 fixedly secured to the plate structure 29 as by weld 32. Thus, as piston 19 moves axially through the cylinder 20, the shaft 17 moves correspondingly to carry with it the closure member 13 from the valve-open position shown in full lines in FIGURE 1 to the valve closed position wherein the peripheral portion 14 of the closure member sealingly engages the seal 15.

The closure member 13 is yieldably retained in position on the shaft 17 against a nut 33 carried on the outer end 34 of the shaft, by means of a light coil spring 35 extending between the plate structure 29 and an annular shoulder 36 provided on the bushing 18. The bushing 18 is provided with a roller bearing structure 37 engaging the outer end 34 of the shaft 17 to permit free axial movement of the bushing and the closure member 13 secured thereto, as by weld 38, on the shaft under the control of spring 35. Thus, should a pressure be directed against the outer face 39 of the closure member 13, the bushing permits the closure member to move to the right, as seen in FIGURE 1, into sealing engagement with the body member notwithstanding a lack of movement of the shaft 17. Thus, the closure member is movable to the closed position selectively by a movement of the shaft 17, or by a movement of the closure member on the shaft 17.

The body member 11 herein comprises an annular flange secured to an outer cylinder 40 by securing means such as weld 41. An inner cylinder 42 is fixedly secured to an inner plate member 43 of the plate structure 29 and supports the outer cylinder by means of a plurality of gussets 44. As shown in FIGURE 1, the inner plate member 43 is secured to a middle plate member 45 of the plate structure 29 by means such as bolts 46. The body flange 11 is secured to a mounting cylinder 47 fixed in the concrete wall 48 defining the space 49 by suitable means such as bolts 50 threaded into a flange portion 51 of the mounting cylinder. The flange body 11 may be sealingly secured to the flange portion 51 by suitable means such as annular sealing gaskets 52. Thus, the valve body 11 and outer cylinder 40 are rigidly mounted in the wall 48 to carry the plate structure 29 coaxially within the opening 53 in the wall 48 to accurately position the closure member 13 in alignment with the seal 15 carried by the body member. The cylinder 20 is carried on the plate structure 29 to extend into space 49.

A protective enclosure 54 is secured to plate 24 as by bolts 55 to preclude inadvertent injury to personnel as by the movement of spring 28 or the retainer 26. To permit the free movement of the retainer 26, the outer end of the housing is defined by a wire mesh screen portion 56 permitting air to move freely inwardly and outwardly relative to the housing 54.

As indicated briefly above, the spring 28 acts against the air pressure within cylinder 20 to urge rod 23 to the right, as seen in FIGURE 1. However, as long as the air pressure is maintained in the cylinder, the rod 23 and the piston 19 are maintained in their leftmost position. When it is desired to close the passage 12, as when an explosion occurs, such as in a nuclear weapons attack, in the space 57 to the left of the wall 48, the cylinder 20 is substantially instantaneously vented to atmosphere by suitable actuation of the dump valve 22 to open the outlet ports 58 thereof. This permits the spring 28 to substantially instantaneously urge the rod 23 to the right carrying with it the piston 19 and the shaft 17 thereby to move the closure member 13 to the right and into sealing association with the valve body 11. To secure the closure member 13 in this closed position, a locking mechanism 59 is provided on plate 24 to lock the rod 23 against movement when the rod is in the rightmost position of FIGURE 1 and air pressure is not being applied within the cylinder 20. When it is desired to reset the valve, the application of air pressure through valve 22 also releases the locking mechanism 59 permitting the air pressure to act against spring 28 and restore the piston 19 to the leftmost position in the cylinder 20.

An air filter 60 may be provided for providing egress and ingress for air relative to the space behind, or to the left, of piston 19 in the cylinder 20 during the movement of the piston therethrough.

In the illustrated embodiment, the closure member 13 may have a diameter of approximately 5¼ inches with the travel thereof between the open and closed positions being approximately 8 inches. Thus, the cylinder may comprise a 6 inch bore cylinder with the piston having an 8¼ inch stroke therein. As indicated above, the air pressure for operating the piston may be approximately 200 p.s.i. The spring 35 may be suitably constructed to permit a movement of the closure member to the closed position thereagainst as by a force of approximately 100 pounds acting against the closure member.

The valve structure 10 is extremely simple in construction and is arranged for facilitated installation in the wall 40. The various elements thereof may be readily serviced as they are readily available from the respective spaces 49 and 57. The dual arrangement for closing the closure member 13 with the valve body assures positive closing of the passage 12 as during an explosion, nuclear incident, or the like effectively protecting equipment and personnel within the space 49, while yet permitting ventilation and the like through the passage 12 during normal conditions.

While I have shown and described one embodiment of my invention, it is to be understood that it is capable of many modifications. Changes, therefore, in the construction and arrangement may be made without departing from the spirit and scope of the invention as defined in the appended claims.

I claim:
1. A blast valve comprising: a valve body defining a passage to be closed; a closure member for closing said passage; a carrier; means for movably supporting said closure member on said carrier for selective movement with said carrier and movement relative to said carrier for disposing said closure member alternatively in an outer passage-open position and an inner passage-closing position; a first fixed abutment on said valve body; first spring means having one end engaging said abutment and an opposite end engaging said carrier for moving said carrier and said closure member therewith inwardly to dispose said closure member in said passage-closing position; fluid pressure means for selectively overcoming said spring means to dispose said carrier in an outer position; a second fixed abutment on said valve body; and second spring means having an end engaging said second abutment and an opposite end engaging said closure member for biasing said closure member outwardly to dispose said closure member in said passage-open position when said carrier is disposed in said outer position.

2. The blast valve of claim 1 including means for releasably locking said carrier with said closure member in the passage-closed position irrespective of the condition of said fluid pressure means.

3. The blast valve of claim 1 wherein said passage comprises a ventilation passage and said first spring means has a strength of approximately 100 pounds, whereby the closure may rapidly move to a closed position by a relatively small force acting thereagainst and thereby permit closure of the passage substantially immediately as the result of an explosion or the like directing a closing force thereagainst.

References Cited by the Examiner
UNITED STATES PATENTS

| | | | |
|---|---|---|---|
| 2,707,484 | 5/1955 | Rush | 251—62 X |
| 2,872,149 | 2/1959 | Battey | 251—61 X |

M. CARY NELSON, *Primary Examiner.*
ARNOLD ROSENTHAL, *Examiner.*